United States Patent
Vichniakov et al.

(10) Patent No.: US 9,426,425 B2
(45) Date of Patent: Aug. 23, 2016

(54) METHOD FOR MEASURING LARGE COMPONENTS

(71) Applicant: Airbus Operations GmbH, Hamburg (DE)

(72) Inventors: Alexei Vichniakov, Buxtehude (DE); Andreas Schulz, Hamburg (DE); Eckhard Tiemann, Hamburg (DE); Jan Looks, Hamburg (DE); Uwe Schubert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/552,004

(22) Filed: Nov. 24, 2014

(65) Prior Publication Data

US 2015/0156462 A1  Jun. 4, 2015

(30) Foreign Application Priority Data

Nov. 28, 2013 (DE) .......................... 10 2013 224 358

(51) Int. Cl.
*G06K 9/00* (2006.01)
*H04N 7/18* (2006.01)
(Continued)

(52) U.S. Cl.
CPC .............. *H04N 7/18* (2013.01); *G01B 11/002* (2013.01); *G01B 11/14* (2013.01); *G01B 11/245* (2013.01); *G01B 11/254* (2013.01); *G06K 9/52* (2013.01); *G06T 7/004* (2013.01)

(58) Field of Classification Search
USPC ................................................. 382/106, 154
See application file for complete search history.

(56) References Cited

U.S. PATENT DOCUMENTS

| | | | |
|---|---|---|---|
| 5,805,289 A | 9/1998 | Corby, Jr. et al. | |
| 6,125,197 A * | 9/2000 | Mack | G06T 7/0057 256/12 |

(Continued)

FOREIGN PATENT DOCUMENTS

| | | |
|---|---|---|
| DE | 199 31 676 A1 | 1/2001 |
| DE | 10 2011 011 392 A1 | 8/2012 |

(Continued)

OTHER PUBLICATIONS

German Search Report for Application No. 10 2013 224 358.8 dated Nov. 11, 2013.

(Continued)

*Primary Examiner* — Alex Liew
(74) *Attorney, Agent, or Firm* — Jenkins, Wilson, Taylor & Hunt, P.A.

(57) ABSTRACT

A method for measuring large components, including providing a large component with markings on at least one outer surface at predefined and spaced-apart locations, providing a camera sensor system having at least one camera and one image analysis device for evaluating a camera image, wherein the position and orientation of the camera in relation to a reference point at a distance from the camera are determined, recording camera images of the individual markings using the camera and transmitting the camera images to the image analysis device, evaluating the camera images using the image analysis device, wherein the position of the individual markings in relation to the position of the camera is determined, and calculating the position of the markings in relation to the reference point from the position of the camera in relation to the reference point and the position of the markings in relation to the camera.

14 Claims, 5 Drawing Sheets

(51) Int. Cl.
  *G01B 11/00* (2006.01)
  *G01B 11/245* (2006.01)
  *G01B 11/14* (2006.01)
  *G01B 11/25* (2006.01)
  *G06K 9/52* (2006.01)
  *G06T 7/00* (2006.01)

(56) References Cited

U.S. PATENT DOCUMENTS

| | | | | |
|---|---|---|---|---|
| 6,431,850 B1 * | 8/2002 | Evans | ............ | B29C 70/44 425/390 |
| 6,724,930 B1 * | 4/2004 | Kosaka | ............ | G01B 11/002 382/154 |
| 2007/0006475 A1 * | 1/2007 | Couture | ............ | B23Q 3/063 33/573 |
| 2007/0265728 A1 | 11/2007 | Marsh et al. | | |
| 2009/0046895 A1 | 2/2009 | Pettersson et al. | | |
| 2011/0103933 A1 | 5/2011 | Olesen et al. | | |

FOREIGN PATENT DOCUMENTS

| | | |
|---|---|---|
| EP | 2 023 077 A1 | 2/2009 |
| EP | 2 444 361 A2 | 4/2012 |
| GB | 2 314 621 A | 1/1998 |
| WO | WO 2012/140190 A1 | 10/2012 |

OTHER PUBLICATIONS

European Search Report for Application No. 14193841 dated Apr. 28, 2015.

* cited by examiner

METHOD FOR MEASURING LARGE COMPONENTS

CROSS-REFERENCE TO RELATED APPLICATION

This application claims priority to German Patent Application No. 10 2013 224 358.8 filed Nov. 28, 2013, the entire disclosure of which is incorporated by reference herein.

TECHNICAL FIELD

The present disclosure relates to a method for measuring, in particular calibrating, large components, in particular structural components of aircraft.

BACKGROUND

The basic requirement of precisely measuring certain components for mechanical processing, for assembly or for materials testing has been known for a long time in the prior art. In the prior art, various methods are used which are particularly adapted to the demands of the component in question, in particular to the size and shape thereof. In the field of aircraft construction, the considerable size of certain components, particularly certain structural components of wings, fuselage or tail unit, represent a challenge with regard to calibrating these large components for mechanical processing, assembly or materials testing.

According to the prior art, such large components are measured in that reference bores are made in the large component, which are then detected by a tactile sensor so that the position of the large component, for example in relation to a kinematics apparatus, can be deduced from the measured position of the reference bores. However, this method has various disadvantages. On the one hand, it is an extremely time-consuming process to make the bores in the large component, this normally taking place in a semi-automatic manner using so-called drill feed units and drilling templates or drill bridges that have to be adjusted manually. On the other hand, it is very complicated, and not always possible, to make the bores on all large components always at the same predetermined positions in the large components, but this is necessary for precise and reliable calibration. In addition, only the coordinates of the large component in one plane, that is to say x, y and rz, can be determined with the tactile measurement method known to date. Further spatial coordinates (z, rx, ry) cannot be measured.

In other branches of industry, such as for example the packaging industry or the automotive industry, easier, faster and more accurate methods for measuring components are used, which are based on an evaluation of camera images. In this case, high-resolution industrial cameras are used to record images of the components, from which the position and orientation of the components are visible or can be calculated.

However, these methods can be transferred to the aviation industry only to a limited extent, since the large components which frequently arise in aircraft construction, such as wings, fuselage or tail unit components, due to their considerable size, cannot be sufficiently captured on a camera image to determine the precise geometry and size thereof with the desired accuracy.

SUMMARY

An object of the present disclosure is therefore that of providing a method for measuring large components, in particular from the aircraft construction industry, which can be carried out in the shortest possible time and using the simplest possible measurement technology while at the same time permitting a measurement accuracy that is as high as possible.

This object is achieved, at least in part, by a method for measuring large components which comprises steps described below.

Firstly, a large component is provided which has markings on at least one outer surface at a plurality of predefined and spaced-apart locations, which markings have a predefined size and shape and are suitable for being precisely identified with regard to their position on the outer surface of the large component, in particular on a camera image (step (a)). Such large components may be structural components of aircraft, in particular wing shell parts, fuselage shell parts or also shell parts of the tail unit, which often have lengths of several meters, frequently over 10 m. The markings should in this case be provided as far as possible at the same, that is to say identical, locations on all the components. The markings should moreover be configured in such a way that they define a fixed location, that is to say a point (for example the center of a cross), which is prominent enough and large enough to be able to be located with the highest possible accuracy on a camera image of the outer surface of the large component.

Then, a camera sensor system is provided which has at least one camera and one image analysis device that is in data connection with the camera for evaluating a camera image recorded by the camera, wherein the position and orientation of the camera in relation to a reference point at a distance from the camera is determined (step (b)). The camera may in this case be a high-resolution industrial camera which is suitable for measuring components. The reference point may in principle be any point which is selected independently of and outside of the camera. The camera may be movable in relation to the reference point, wherein the position and orientation of the camera in relation to the reference point is measured continuously or at fixed intervals, or may be fixed in relation to the reference point, wherein the fixed position and orientation of the camera in relation to the reference point is known.

As the next step, camera images of the individual markings are recorded using the camera and are transmitted to the image analysis device (step (c)). Here, each marking is preferably recorded individually and from the most frontal position possible. A single movable camera or a plurality of cameras may be provided. It is also conceivable that a plurality of camera images of a single marking are recorded from different perspectives.

Then, the camera images are evaluated using the image analysis device, wherein the position of the individual markings in relation to the position of the camera is determined (step (d)). The image analysis device may comprise a conventional computer which uses suitable image analysis software, such as for example "Halcon" from MVTec or "Common Vision Blox" from Stemmer Imaging. By such software, the position of the markings shown on the camera images in relation to the camera at the time of recording can be determined from the size and shape of the markings shown on the camera images. The known actual shape and size of the markings can serve as a reference parameter here.

As the last step, the position of the markings in relation to the reference point is calculated from the position of the camera in relation to the reference point and the position of the markings in relation to the camera (step (e)). This may take place for example through coordinate transformation. Then, for example by an interpolation of the marking points, the dimensions of the large component and the position and orientation thereof in relation to the reference point can be determined in an approximate fashion from the position of the markings in relation to the reference point. The more markings that are provided and recorded, the more accurately the large component can be measured.

In the method according to the disclosure, therefore, it is not one single camera image of the large component that is recorded and evaluated in order to determine the dimensions of the large component, but rather a plurality of camera images of individual details of the large components, the markings, are recorded and are analyzed with regard to the position of these details, so that the measured geometry and position of the large component as a whole is obtained from the sum of the positions of the individual details. In this way, the camera measurement method, which is much more accurate and much less complicated than the customary haptic measurement method, can also be transferred to large components, in particular those used in aircraft construction.

In an embodiment, the position of the individual markings in relation to the position of the camera is determined, using a distance scale, that is to say the magnification of the camera, from a comparison of the known predefined size and/or shape of the markings and the size and/or shape of the markings shown on the camera image. The distance scale can be determined, that is to say calibrated, in advance. When determining the size of the markings shown on the camera image, it is possible, for example, to count the number of pixels. Using the known actual size and the size of the markings shown on the camera image, a size deviation can be determined which, according to the distance scale, is assigned to a certain distance between the marking and the camera. From the orientation of the camera, which is likewise known, it is thus possible to determine the entire distance vector from the camera to a marking.

In an alternative example embodiment, the position of the individual markings in relation to the position of the camera is determined from a comparison of two camera images recorded from different positions, on the basis of the size and/or shape of the markings shown on the camera images. First, therefore, one camera image is recorded and then the camera is moved by a predefined or measured distance and finally a further camera image is recorded, so that the difference in size and/or shape between the two camera images can be assigned to this known distance, from which in turn a distance scale can be determined.

According to both the alternatives described above, a simultaneous use of two cameras (optical stereo system) is also possible. In this case, the position of the marking in space in relation to the camera is calculated by the spatial intersection (bundle triangulation).

According to a further embodiment, target positions for the markings are determined, the target positions being predefined in relation to the reference point, and the target positions are compared with the measured positions of the markings. The target positions are therefore fixed or at least can be measured in relation to the reference point. The deviations of the measured current positions of the markings from the predefined target positions give the current position and dimensions of the large component, which can consequently be taken into account in the further processing of the large component. The target positions of the markings can be measured for example by a laser tracker on the curing mold in which the large component cures during manufacture and on which negative forms corresponding to the markings are provided, which introduce the markings into the outer surface of the large component during the curing process. To this end, the negative forms can be replaced by adapters, on which in turn reflector spheres are placed. In this way, the camera measurement can be attributed to the curing mold which is at the start of the manufacturing process for the component in question.

In this case, the camera can in one aspect be fitted on a section of a kinematics apparatus that is movable in relation to the reference point. Such a kinematics apparatus may be for example an apparatus, in particular a robot or a linearly displaceable apparatus such as for example the frame of a milling machine, for mechanical processing, for holding purposes during structural assembly or for materials testing. In this way, the camera can be moved in relation to the reference point, wherein at the same time the position of the camera in relation to the reference point is detected by displacement sensors on the movable parts of the kinematics apparatus. As an alternative, the position of the camera in relation to the reference point can also be measured by a laser tracker.

The kinematics apparatus can have a base section and a processing section which is movable in relation to the base section and on which the camera is fitted. Furthermore, a component clamping device can be provided for holding the large component in a fixed or measured position in relation to the base section of the kinematics apparatus. The reference point may in this case preferably be provided on the base section of the kinematics apparatus and may represent for example the zero point of the kinematics apparatus which pertains to the origin of all the kinematic axes of the kinematics apparatus. As an alternative, however, the reference point may also be provided on the component clamping device. The base section may in this case be for example the frame of an assembly robot that is fixedly connected to the floor, for example of a factory, and the processing section may be a movable arm of the robot. A tool holder (Tool Center Point (TCP)) for holding a processing, testing or assembly tool may be provided on the processing section at a location that is fixed in relation to the camera, so that the position of the workpiece holder or of a workpiece held therein can always be determined directly from the position of the camera. The camera may also be fitted directly in the tool holder.

The component clamping device may be, for example, a device for holding the workpiece during the mechanical processing, assembly or materials testing. This may either be fixedly connected to the base section of the kinematics apparatus, so that a position of the component clamping device in relation to the base section is predefined, or it may be displaceable in relation to the base section of the kinematics apparatus, wherein the positions of the component clamping device and of the base section in relation to one another can be measured.

The kinematics apparatus may have a plurality of processing sections, the translational and/or rotary actuators. Each actuator has a suitable distance measurement system. The control device of this kinematics apparatus communicates continuously with the distance measurement systems of the actuators. The control device calculates the adjustment parameters for the drives of the actuators on the basis of the measurement data of the distance measurement systems and the target positions to be reached. At all times, therefore, the control system also knows the position and orientation of the tool holder, and thus of the camera, in the coordinate system of the kinematics apparatus.

A displacement and/or rotation of the entire large component relative to a target position of the large component can be determined from the deviations of the measured positions of the markings from the known target positions, and the coordinates of the displacement and/or rotation relative to the target position are transmitted to a control device of the kinematics apparatus. In this way, the processing of the large component by, for example, a milling tool or a riveting tool can take place starting from the current position of the large component. In this case, a resulting component zero point can be determined from the currently measured positions of the markings and a resulting target zero point can be determined from the target positions of the markings, so that only the resulting shift of the component zero point in relation to the target zero point has to be ascertained and transmitted to the control device of the kinematics apparatus. This can simplify the measurement and control process. The component zero point can be determined using suitable calculation software, such as for example "Spatial Analyzer". The target zero point can also be defined independently of the target positions.

According to one embodiment, the target positions of the markings are aimed at when recording camera images of the individual markings. That is to say that the camera is always directed toward the target positions and thus records the markings—if the positions thereof do not coincide with the target positions—with a certain offset from the center of the image. However, this offset is usually so small that a camera image of the markings that is sufficiently accurate for the measurement can be recorded. The advantage when aiming at the target positions is that the camera records the camera images from the same fixed positions for all components having markings arranged at identical positions. In this way, it is not necessary constantly to transmit the position of the camera to the image analysis device, but rather only to transmit which of the target positions is being aimed at. The coordinates of the camera when aiming at the target positions can already be stored in the image analysis device. The camera fitted on the processing section is, in relative terms, always moved in the same way in relation to the target position of the respective marking. It must be assumed that the measurement range of the camera measurement system is sufficient to determine the possible position deviation of the marking.

In a further embodiment, the markings are configured as separate parts and are fastened to the outer surface of the large component. They may for example be glued to the outer surface of the large component. In this case, however, care must be taken to ensure that the position of the markings is the same on all the large components so that, ideally, they can coincide with the target positions.

According to one alternative embodiment, the markings are integral with the large component. They may for example be formed in or formed on the outer surface of the large component. In this way, it is easier to ensure that the markings are positioned at and also remain at the intended locations on the large component.

In this case, the large component can be formed from a plastics material, in particular from CFRP, and the markings can be introduced during the process of curing the plastics material at the time of manufacture of the large component, by virtue of corresponding negative forms of the markings on the curing mold in which the large component cures. The negative form may in this case comprise both a cavity and a protruding bulge. In this way, the situation can be achieved whereby the markings are formed integrally with the large component on the outer surface thereof, and whereby the markings are reliably provided at the same positions on all the large components that are manufactured using this curing mold, so that each large component can be measured with a constant measurement accuracy.

In this case, the markings can be impressed into the outer surface of the large component or project from this outer surface as a result of an accumulation of resin. To this end, the negative forms of the markings must either protrude in a stamp-like manner in the curing mold or must be formed as indentations in the curing mold, so that resin can accumulate therein. The negative forms, that is to say the form-giving elements of the curing apparatus which create the markings on the large components during the curing process, can be configured in such a way that they can be replaced in the easiest possible manner. Negative forms that are worn should be replaced so that a constant good quality of the markings can be ensured.

However, the negative forms may also be introduced into the outer surface on that side of the large component on which the large component is exposed and does not bear against the curing mold. To this end, the negative form is then introduced manually or by machine into the exposed outer surface of the large component, independently of the curing mold.

In a further embodiment, the markings are star-shaped, in particular cross-shaped. Star-shaped means that a plurality of spaced-apart sections extend radially away from a central point. Cross-shaped means that four sections evenly spaced from one another extend radially away from a central point. Such a star shape or cross shape can be identified and precisely located particularly easily on the outer surface of the large component or on a camera image of the surface.

BRIEF DESCRIPTION OF THE DRAWINGS

The present disclosure will be explained in more detail below with reference to a drawing which shows one example embodiment. In the drawing.

DETAILED DESCRIPTION

Figure 1:
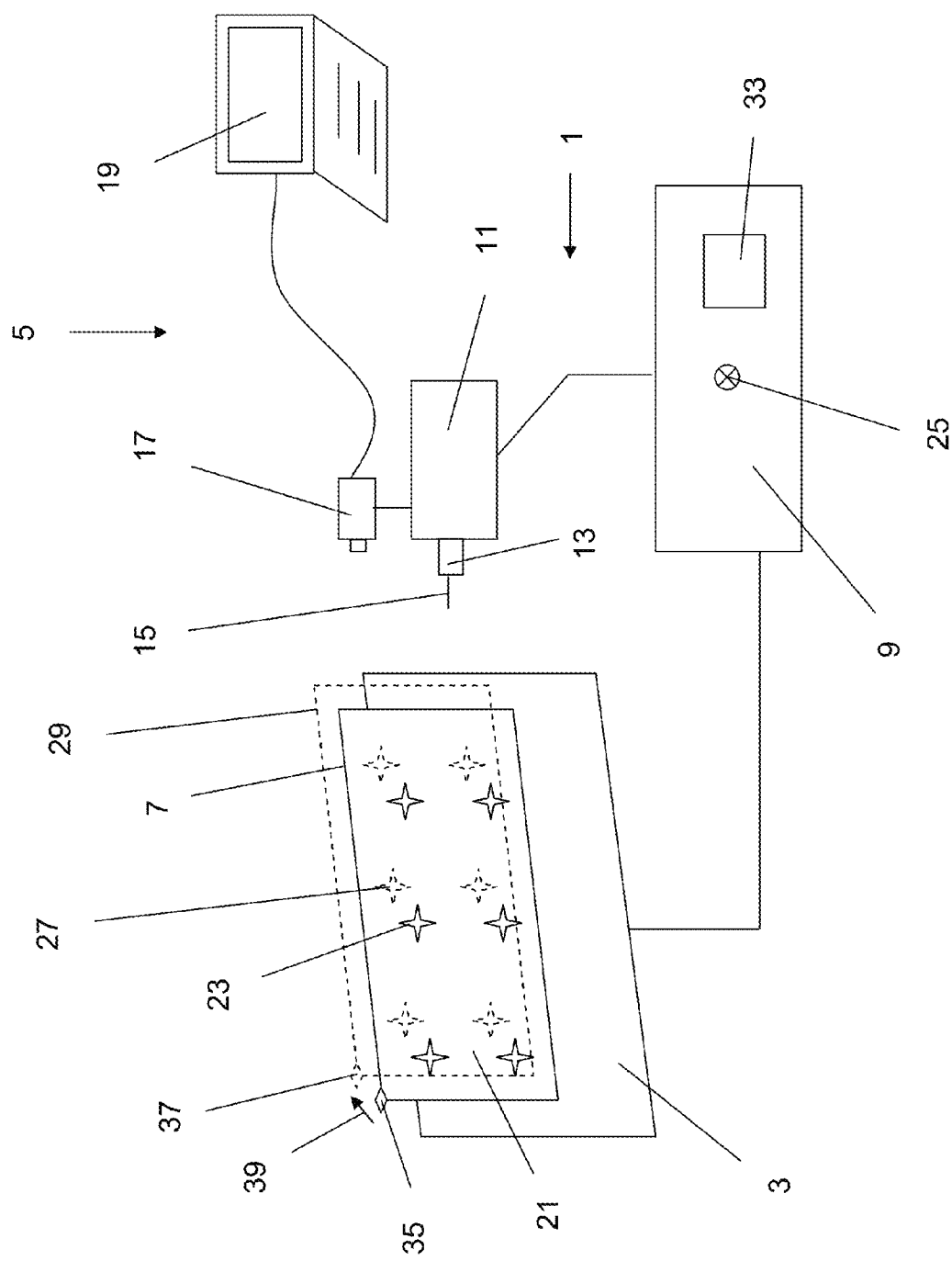
FIG. 1 shows a schematic view of one example embodiment of a kinematics apparatus and of a component clamping device for carrying out the method according to the disclosure for measuring large components.

FIG. 1 shows an example embodiment of a kinematics apparatus 1 together with a component clamping device 3 and a camera sensor system 5 for carrying out the method according to the disclosure for measuring large components 7.

The kinematics apparatus 1 has a base section 9 and a processing section 11 which is movable in relation to the base section 9. A tool holder 13, with a milling tool 15 held in the tool holder 13, is provided on the processing section 11. The camera 17 of a camera sensor system 5 is also fitted on the processing section 11 at a fixed distance from the tool holder 13. The camera sensor system 5 furthermore has an image analysis device 19 in the form of a computer with suitable image analysis software, in the present case "Halcon" from MVTec or "Common Vision Blox" from Stemmer Imaging, which is in data connection with the camera 17. The base section 9 of the kinematics apparatus 1 is fixedly connected to the component clamping device 3, in which there is held a large component 7 that is to be measured.

The large component 7 has markings 23 on its outer surface 21 at a plurality of predefined and spaced-apart locations, which markings in turn have a predefined size and shape and are suitable for being precisely identified on a camera image with regard to their position on the outer surface 21 of the large component 7. Also provided on the base section 9 of the kinematics apparatus 1 is a reference point 25 which, in the present example embodiment, represents the zero point of the kinematics apparatus 1, at which the kinematic axes of the kinematics apparatus 1 are in a zero position. At locations in space along the component clamping device 3, which are predefined in relation to the reference point 25, FIG. 1 shows a plurality of target positions 27 for the markings 23, as well as a target position 29 of the large component 7 resulting from these target positions 27. The coordinates of these target positions 27 have been determined in advance, that is to say prior to the measurement method, in a calibration step and are stored in the image analysis device 19.

Figure 2:
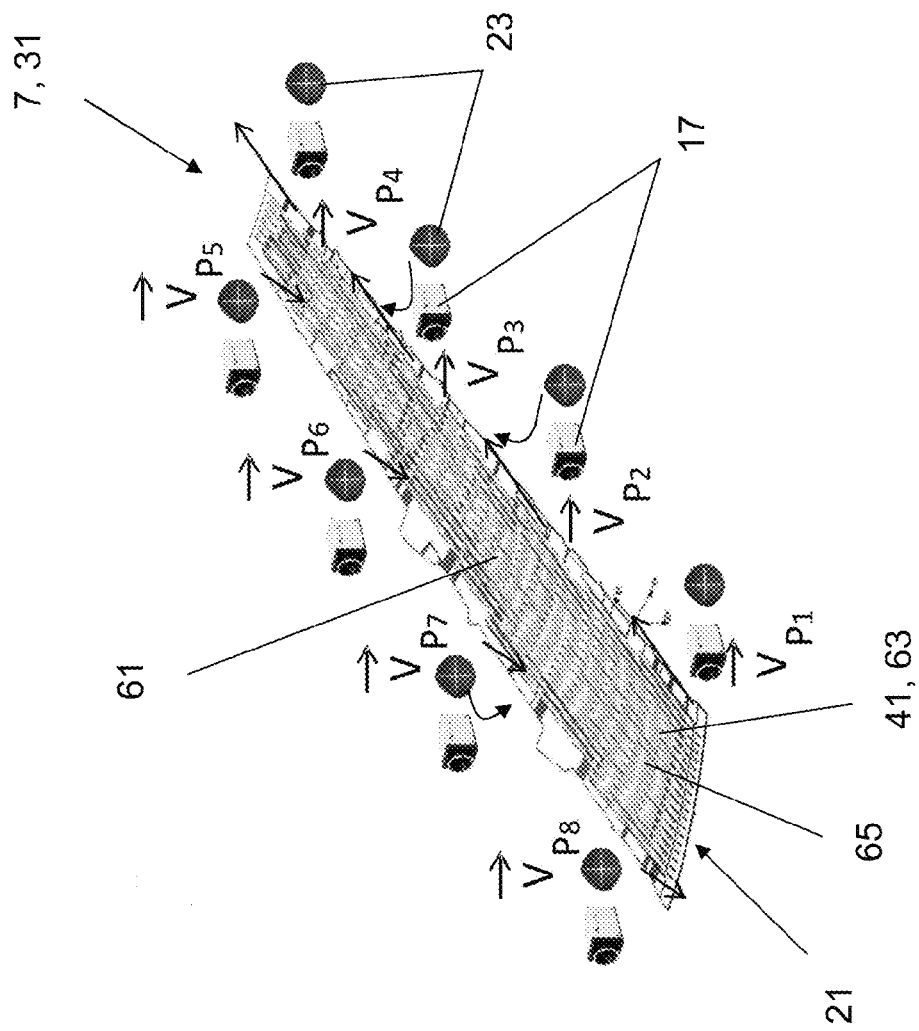
FIG. 2 shows a perspective view of the large component according to FIG. 1 in the form of a wing shell part with a plurality of markings and displacement vectors which illustrate the deviations of the markings from the target positions.

When a large component 7, such as for example the aircraft wing shell part 31 shown in FIG. 2, is to be measured prior to processing by the kinematics apparatus 1, that is to say in the present case prior to processing by milling, the large component 7 is first clamped in the component clamping device 3, wherein the markings 23 may lie at a certain distance from the target positions 27 of the markings 23. The processing section 11 of the kinematics apparatus 1 with the camera 17 fastened thereto then moves in relation to the clamped large component 7 in such a way that the processing section 11 approaches the individual target positions 27 for the markings 23 one after the other and in doing so aims the camera 17 at the target positions 27 one after the other.

When aiming at a target position 27, the camera 17 thus records at least one camera image from this position, that is to say directed toward the target position 27, on which camera image it is then possible to see the marking 23 which is provided on the outer surface 21 of the large component 7 and which is usually located at a certain distance from the target position 27. The recorded camera images are then transmitted to the image analysis device 19, where they are evaluated with the aid of image analysis software, in this case "Halcon" by MVTec or "Common Vision Blox" by Stemmer Imaging, and the positions of the individual markings 23 in relation to the position of the camera 17 are determined. The current position of the markings 23 in relation to the camera 17 is in this case determined from the known position and orientation of the camera 17, from the known size and shape of the markings 23 and from a distance scale by which the distance or position of these markings 23 in relation to the camera 17 can be determined from the size and/or shape of the markings 23 recorded on the camera image.

Finally, the position of the markings 23 in relation to the reference point 25 and thus also in relation to the target positions 27 is calculated from the known position of the camera 17, or the position measured during the movement of the camera 17, in relation to the reference point 25 and the previously determined position of the markings 23 in relation to the camera 17. This calculation step may also be carried out in the image analysis device 19 or else in a different computing device.

The positions of the markings 23 in relation to the target positions 27 can also be determined directly from the camera image, that is to say from the offset of the positions of a marking 23 from the image center point, which represents the target position, using a distance scale which assigns this offset of the markings 23 on the camera image to an actual distance.

In order then to supply a control device 33 of the kinematics apparatus 1 with the current dimensions of the large component 7, so that a precise processing of the large component 7 by the kinematics apparatus 1 can take place, the measured current positions of the markings 23 are then compared with the target positions 27, for example likewise by the image analysis device 19, and the deviations or displacements of the current positions of the markings 23 in relation to the target positions 27 (shown in FIG. 2 as displacement vectors $V_{p1}$ to $V_{p8}$) are determined and are transmitted to the control device 33 of the kinematics apparatus 1 in order to correct and/or update the position of the large component 7 that is presently located in the component clamping device 3. For simplification purposes, a resulting component zero point 35 can be determined from the measured positions of the markings 23 and a resulting target zero point 37 can be determined from the target positions 27, so that only one comparison between the component zero point 35 and the target zero point 37 is necessary and a resulting zero point displacement vector 39 is obtained. The component zero point 35 may be determined using suitable calculation software, such as for example "Spatial Analyzer". The current position and orientation of the large component 7 in relation to the reference point 25 can be determined, for example, by interpolation from the measured positions of the markings 23.

In order that the markings 23 are provided at identical predefined positions on all the large components 7 to be measured, the markings 23 according to the present example of embodiment are already formed in the plastic 41, that is to say in the CFRP structure, at the time of manufacture of the large component 7, that is to say at the time of curing the wing shell part 31 shown in FIG. 2, which in the present case is made of CFRP material. To this end, the negative forms 43 shown in FIGS. 3 to 5 are used.

Figure 3B:
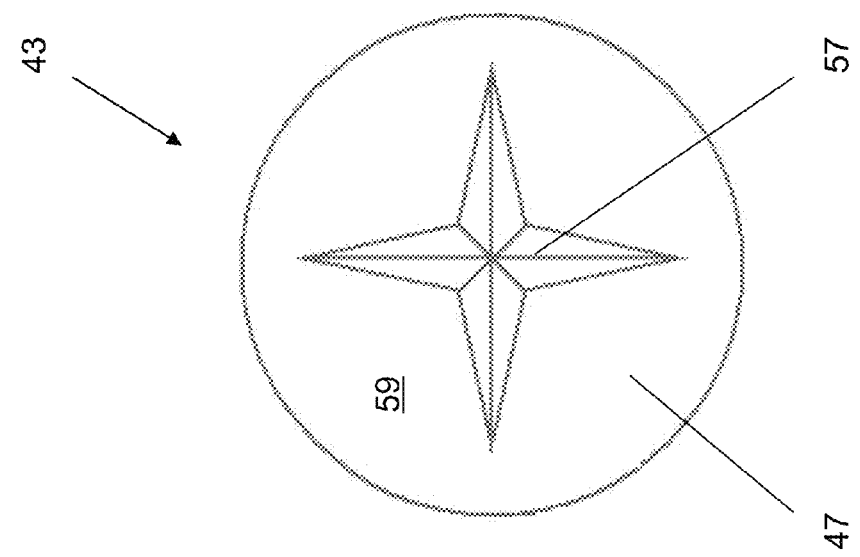
FIG. 3b shows a plan view of the negative form of FIG. 3a, FIG. 4 shows a sectional view of the negative form of FIG. 3a, received in a sleeve in a curing mold.
Figure 3A:
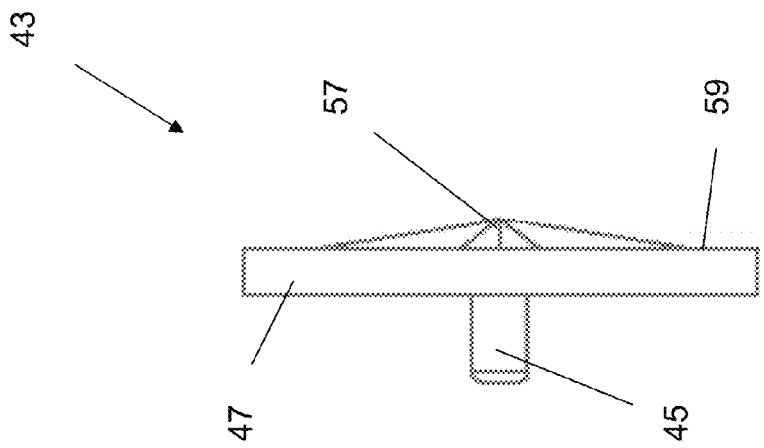
FIG. 3a shows a side view of a negative form for introducing a marking into the outer surface of the large component of FIG. 2, in the shape of a star or cross.
Figure 4:
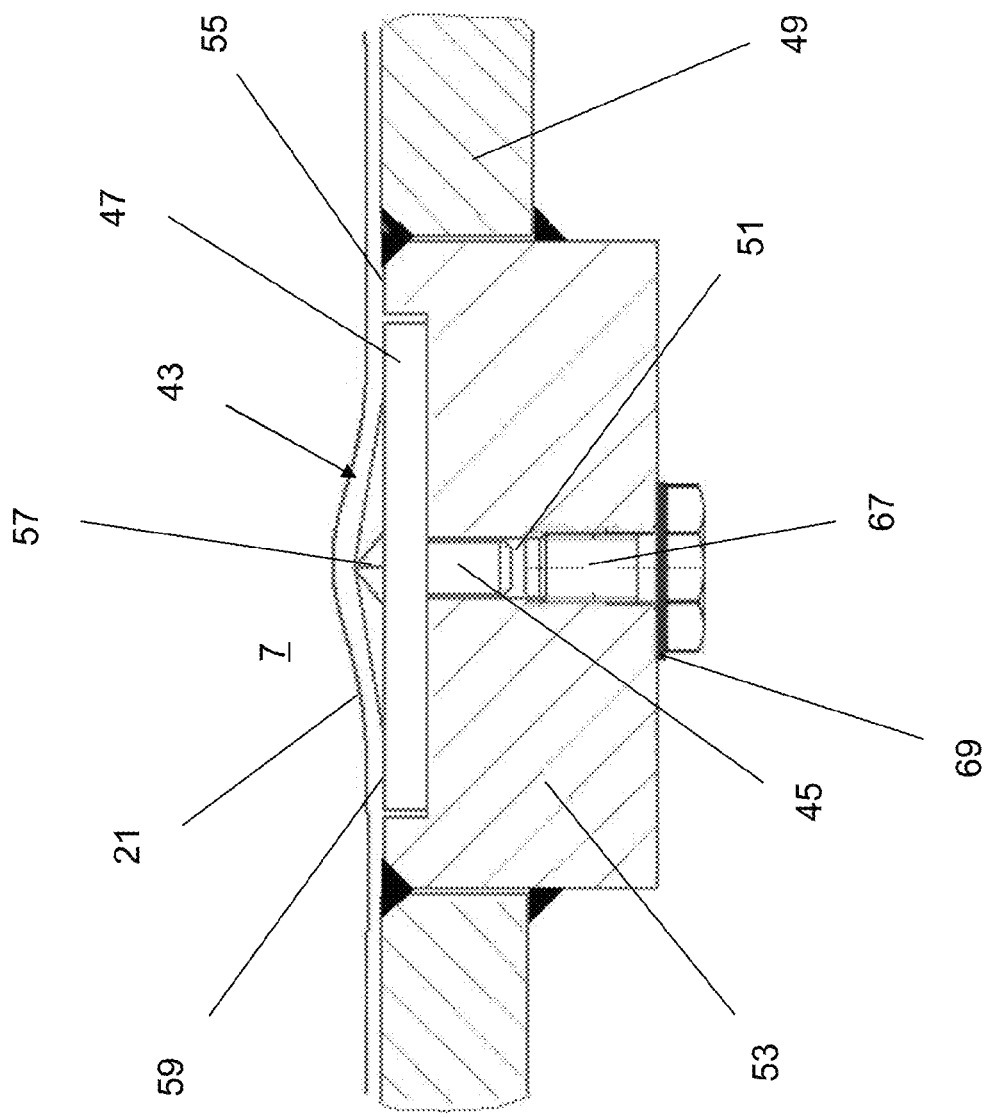

As shown in FIGS. 3a and 3b, the negative forms 43 have a pin 45 and a head 47, wherein the pin 45 is introduced into a bore 51 or sleeve 53 provided in a curing mold 49 and is fastened therein so that the head 47 is oriented toward the inner surface 55 of the curing mold 49 that faces toward a large component 7 curing in the curing mold 49, as can be seen in FIG. 4. There is formed on the head 47 a star shape 57 or cross shape which projects from a surface 59 of the head 47 facing away from the pin 45. This projecting star shape 57 thus also protrudes beyond the inner surface 55 of the curing mold 49 and impresses a corresponding positive of the star shape 57 into the outer surface 21 of the large component 7 curing in the curing mold 49. Since these negative forms 43 are always provided at the same fixed position in the curing mold 49, the markings 23 on the outer surface 21 of the large component 7 are thus also always formed at the same position.

Figure 5:
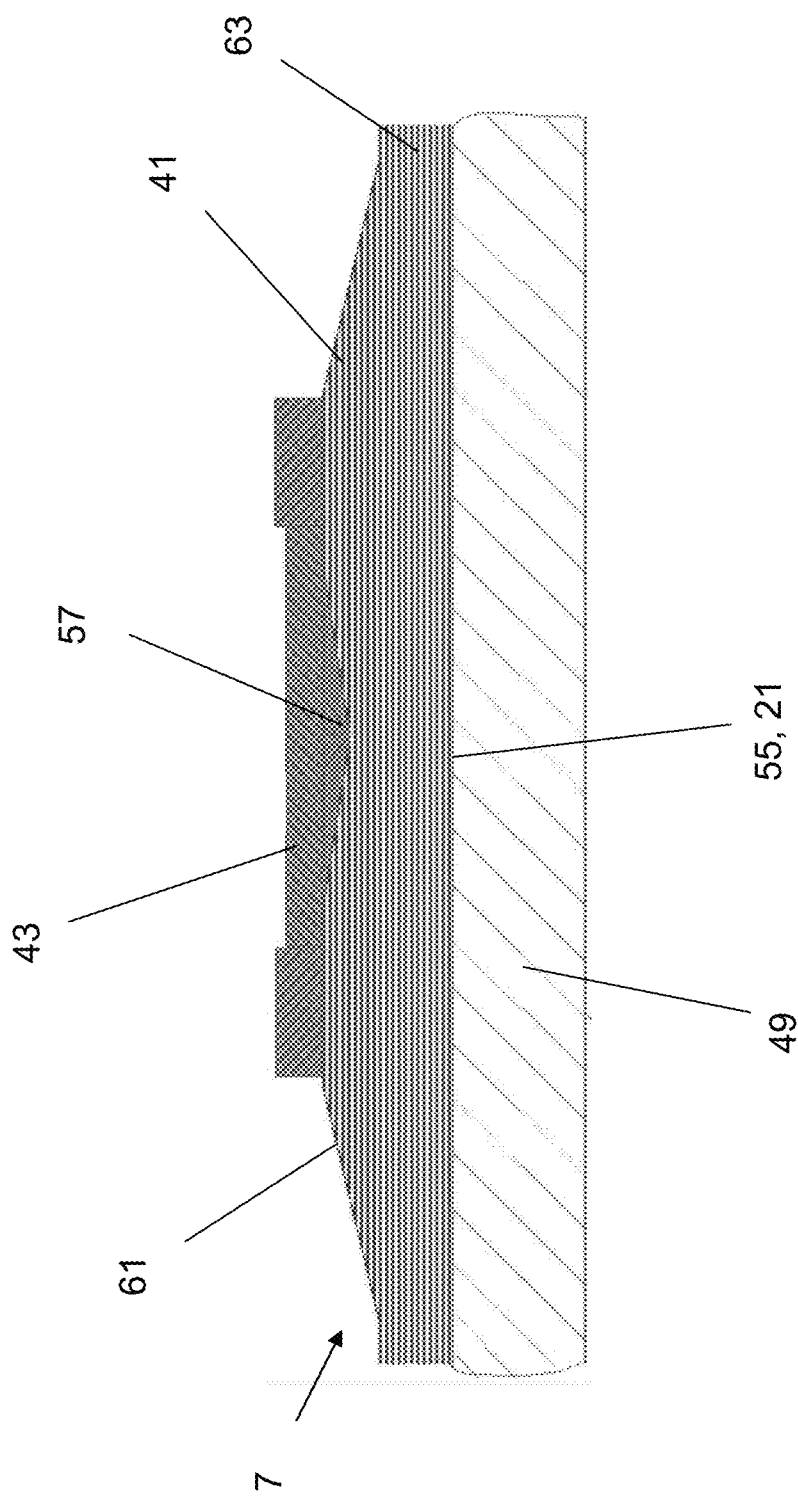
FIG. 5 shows an alternative negative form introduced into the exposed outer surface of the large component, the exposed outer surface being located opposite the curing mold.

FIG. 5 shows an alternative to FIG. 4, wherein the marking by the negative form 43 is not impressed into the plastic 41 on the outer surface 21 of the large component 7 that faces toward the curing mold 49, but rather is introduced into the plastic 41 on the exposed surface 61 facing away from the curing mold 49 by a separate negative form 43, for example manually or by machine.

A stand-alone inventive aspect relates to the manufacture of a plastic component, in particular a large component 7, such as for example an aircraft structural component made of CFRP material, such as the wing shell part 31 of FIG. 2, with markings 23 provided in the outer surface 21 thereof for orientation purposes when measuring the large component 7.

To this end, first a negative form 43 is fastened to the inner side of a curing mold 49 that faces toward a plastic component to be cured, in particular a large component 7. The negative form 43 preferably has a pin 45 and a head 47, wherein a stamp, preferably a star shape 57 or cross shape facing away from the pin 45, projects from the head 47. The pin 45 is received in a bore 51 or sleeve 53 in the curing mold 49. The negative form 43 is preferably fastened to the inner surface 55 of the curing mold 49 in such a way that only the stamp, that is to say the star shape 57, projects beyond the inner surface 55 of the curing mold 49 (see FIGS. 3*a*, 3*b* and 4). As an alternative, the negative form 43 may also comprise for example star-shaped indentations so that, at these locations, an accumulation of resin can form which would project beyond the outer surface 21 on a cured plastic component or large component 7.

The plastic 41, that is to say the resin, and also the fiber layers 63 and, optionally, reinforcing elements, such as stringers 65 for example, can then be introduced into the curing mold 49. After curing, the finished plastic component, in particular the large component 7 made of CFRP material, is removed from the curing mold 49, wherein corresponding markings 23, preferably in the shape of a star or cross, are formed in the plastic 41 at the locations at which the plastic 41 bore against the negative form 43. These markings 23 are therefore provided at the same predefined position on each plastic component manufactured using the present curing mold 49, as a result of which the orientation on the basis of these markings 23, when measuring the plastic component in particular by a camera sensor system 5, is more reliable and thus the measurement is improved.

The negative forms 43 on the curing mold 49, which create the markings 23 on the large components 7 during the curing process, should be configured in such a way that they can be replaced as easily as possible. Worn negative forms 43 should be replaced so that a consistent good quality of the markings 23 can be ensured. The possibility for replacement is illustrated in FIG. 4 by the locking screw 67 with the sealing ring 69. Once this locking screw 67 has been removed, the negative form 43 can be driven out from below.

As an alternative, the negative form 43 can also be pressed onto the exposed surface 61, which does not bear against the curing mold 49, of the curing plastic component, that is to say of the large component 7, as shown in FIG. 5.

While at least one exemplary embodiment of the present disclosure has been shown and described, it should be understood that modifications, substitutions and alternatives may be apparent to one of ordinary skill in the art and can be made without departing from the scope of the subject matter described herein. This application is intended to cover any adaptations or variations of the specific embodiments discussed herein. In addition, in this application, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A method for measuring large components, comprising:
providing a large component which has markings on at least one outer surface at a plurality of predefined and spaced-apart locations, wherein the markings have a predefined size and shape and are suitable for being precisely identified with regard to a position of the markings on the outer surface of the large component,
providing a camera sensor system having at least one camera and one image analysis device that is in data connection with the camera for evaluating a camera image recorded by the camera, wherein a position and orientation of the camera in relation to a reference point at a distance from the camera is determined,
recording camera images of the markings using the camera and transmitting the camera images to the image analysis device,
evaluating the camera images using the image analysis device, wherein a position of the markings in relation to the position of the camera is determined, and
calculating the position of the markings in relation to the reference point from the position of the camera in relation to the reference point and the position of the markings in relation to the camera,
wherein target positions for the markings are determined, the target positions being predefined in relation to the reference point, and the target positions are compared with measured positions of the markings.

2. The method according to claim 1, wherein the position of the individual markings in relation to the position of the camera is determined, using a distance scale, from a comparison of the predefined size and/or shape of the markings and a size and/or shape of the markings shown on the camera image.

3. The method according to claim 1, wherein the position of the individual markings in relation to the position of the camera is determined from a comparison of two camera images recorded from different positions, on the basis of a size and/or shape of the markings shown on the camera images.

4. The method according to claim 1, wherein the camera is fitted on a section of a kinematics apparatus that is movable in relation to the reference point.

5. The method according to claim 4, wherein the kinematics apparatus has a base section and a processing section which is movable in relation to the base section and on which the camera is fitted.

6. The method according to claim 5, wherein a component clamping device is provided for holding the large component in a fixed or measured position in relation to the base section of the kinematics apparatus.

7. The method according to claim 5, wherein the reference point is provided on the base section.

8. The method according to claim 4, wherein a displacement and/or rotation of the large component relative to a target position of the large component is determined from deviations of the measured positions of the markings from the target positions, and
wherein coordinates of the displacement and/or rotation relative to the target position are transmitted to a control device of the kinematics apparatus.

9. The method according to claim 1, wherein the target positions for the markings are aimed at when recording camera images of the markings.

10. The method according to claim 1, wherein the markings comprise separate parts fastened to the outer surface of the large component.

11. The method according to claim 1, wherein the markings are integral with the large component.

12. The method according to claim 11, wherein the large component is formed from a plastic, and wherein the markings are introduced during a process of curing the plastic at a time of manufacture of the large component, by virtue of corresponding negative forms of the markings on a curing mold in which the large component cures.

13. The method according to claim 12, wherein the markings are impressed into the outer surface of the large component or project from the outer surface as a result of an accumulation of resin.

14. The method according to claim 1, wherein the markings are star-shaped or cross-shaped with four sections evenly spaced from one another and extending away from a central point.

* * * * *